UNITED STATES PATENT OFFICE.

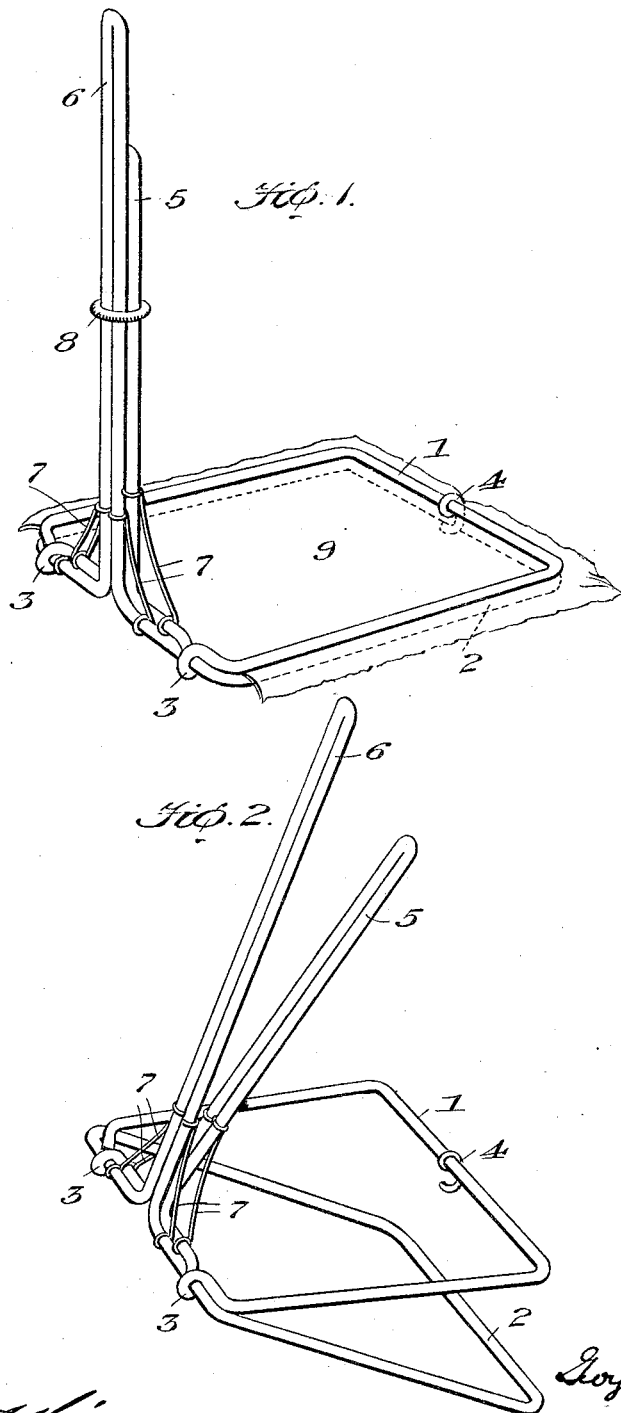

GEORGE O. WALKER, OF WALKER, OREGON.

INSECT-CATCHER.

1,102,829.  Specification of Letters Patent. Patented July 7, 1914.

Application filed April 15, 1913. Serial No. 761,229.

*To all whom it may concern:*

Be it known that I, GEORGE O. WALKER, a citizen of the United States, residing at Walker, county of Lane, and State of Oregon, have invented certain new and useful Improvements in Insect-Catchers, of which the following is a specification.

This invention relates to insect catchers.

The object of the invention is the provision of a simple and inexpensive device, adapted to removably hold a piece of sticky fly paper or other substance, and of improved construction, which will have a holder and handles constructed and relatively arranged in an improved fashion, whereby the operator can manipulate the holder by a handle, without having to grasp the holder and which will also enable the device to be operated while the user is standing erect, enabling him to brush, scare or jar insects onto the sticky fly paper or other substance, held by the holder.

The invention is especially adapted for catching insects such as fleas, beetles and bugs infesting plants and its construction permits it to be held with one hand with the holder and sticky fly paper so disposed in a general horizontal direction that, with the other hand, the user may manipulate a brush or broom to cause the insects to come in contact with the sticky paper or other substance.

The present invention consists, first, in the holder and the handles for opening and closing the parts of the holder; and, second, in the holder combined with the handles, the latter being arranged angularly to the holder so that when they are grasped, the sticky fly paper held by the holder may be conveniently made to assume a position best designed to insure the catching of the insects when knocked or brushed from a plant.

In the accompanying drawings: Figure 1 is a perspective of the invention when closed and ready for use; and Fig. 2, a similar view of it when open.

The parts of the device are formed of wire. The holder consists of open frames 1 and 2, preferably of rectangular form, which are hinged together at 3 by coiling one around the other and they are adapted to be secured together by any suitable catch 4. Handles 5 and 6 are provided for the respective frames 1 and 2 and are preferably formed of the same piece of wire therewith. One or both of the handles may be braced from its frame by braces 7. The handles are preferably of different lengths and are adapted to lie flat against each other when the frames 1 and 2 are closed.

If desired, a fastener 8 may be employed to secure the handles together, but this is unnecessary in view of the employment of the catch 4. The handles 5 and 6 are disposed angularly to the frames 1 and 2, respectively, and preferably at right angles thereto.

The sticky fly paper 9 is held by the binding action of the frames 1 and 2 of the holder when said frames are together. The catch 4 permits unlocking the frames and the substitution of another piece of sticky fly paper when desired.

In using the invention, the operator grasps the handles 5 and 6 with one hand and disposes, while in standing position, the holder composed of the frames 1 and 2, in general horizontal position adjacent the plant or bush from which the insects are to be caught. Using his remaining hand, the insects may be jarred or brushed from the plant onto the sticky fly paper 9.

Unlike those holders for sticky fly paper which have heretofore been used as insect traps and are designed to be laid flat on the floor or on a table or hung from the wall, the present invention is intended for use as a portable catcher and particularly for catching insects on plants and bushes. The disposition of the handles 5 and 6 in substantially fixed relation to the frames 1 and 2 and preferably at right angles thereto and of sufficient length, enables the user to retain a standing position while catching the insects and relieves him of any fatigue which would be necessitated if the handles were not employed and combined as set forth, with the frames 1 and 2.

Having thus described my invention, what I claim as new and desire to secure by Letters Patent, is:—

An insect catcher consisting of relatively movable open wire frames hinged together at one side in direct contact with each other and at their opposite sides provided with means for fastening them together in direct contact, wire handles rigidly connected to the hinged sides of the respective frames in fixed angular relation thereto and adapted to close together when the frames are closed, and a sticky sheet detachably held between said frames.

In testimony whereof, I hereunto affix my signature in presence of two witnesses.

GEORGE O. WALKER.

Witnesses:
 JAMES L. PLASTER,
 WARD BERG.

Copies of this patent may be obtained for five cents each, by addressing the "Commissioner of Patents, Washington, D. C."